United States Patent [19]

Regehr et al.

[11] Patent Number: 4,581,051
[45] Date of Patent: Apr. 8, 1986

[54] APPARATUS FOR THE SEPARATION OF LIQUID DROPS OR PARTICULATE SOLIDS FROM A GAS STREAM

[75] Inventors: Ulrich Regehr; Horst Hannemann, both of Aachen; Ernst A. Reinhard, Alsdorf; Matthias Jansen, Stolberg, all of Fed. Rep. of Germany

[73] Assignee: Aktiebolaget Carl Munters, Sollentuna, Sweden

[21] Appl. No.: 540,293

[22] Filed: Oct. 11, 1983

[30] Foreign Application Priority Data

Oct. 12, 1982 [DE] Fed. Rep. of Germany ....... 3237720
Jan. 12, 1983 [DE] Fed. Rep. of Germany ....... 3300808

[51] Int. Cl.4 .............................................. B01D 45/00
[52] U.S. Cl. ........................................ 55/440; 55/464
[58] Field of Search ................. 55/257 PV, 440, 442, 55/443, 464

[56] References Cited

U.S. PATENT DOCUMENTS

| | | | |
|---|---|---|---|
| 2,643,736 | 6/1953 | Smith | 55/440 X |
| 3,358,580 | 12/1967 | Freese et al. | 55/440 X |
| 3,849,095 | 11/1974 | Regehr | 55/440 X |
| 3,870,488 | 3/1975 | Arndt et al. | 55/440 |
| 3,912,471 | 10/1975 | Cotton | 55/440 |
| 3,953,183 | 4/1976 | Regehr | 55/440 |
| 4,198,215 | 4/1980 | Regehr | 55/440 X |

Primary Examiner—Charles Hart

[57] ABSTRACT

Illustrated and described is an apparatus for the separation of liquid drops or particulate solids from a gas stream comprising a plurality of parallel separator plates, a flow passage being formed between every two separator plates, each separator plate having at least one wave crest disposed approximately in its center and two wave troughs disposed at its edge on the inlet side and the outlet side, respectively, and forming an inlet section and an outlet section, respectively, as well as impingement-wall sections formed between the wave crest and the wave troughs, a main phase-separator chamber open in a direction counter to the direction of the gas flow being formed externally on the wave crest.

In accordance with the invention, high separation efficiency with low pressure drop or low energy loss is obtained by providing an inlet nozzle formed in the inlet section, the gas stream being directable by means of the inlet nozzle onto the region on the inlet side of the opposite impingement-wall section.

23 Claims, 5 Drawing Figures

APPARATUS FOR THE SEPARATION OF LIQUID DROPS OR PARTICULATE SOLIDS FROM A GAS STREAM

The invention relates to an apparatus for the separation of liquid drops or particulate solids from a gas stream comprising a plurality of parallel separator plates, a flow passage being formed between every two separator plates, each separator plate having at least one wave crest disposed approximately in its center and two wave troughs disposed at its edge on the inlet side and the outlet side, respectively, and forming an inlet section and an outlet section, respectively, as well as impingement-wall sections formed between the wave crest and the wave troughs, a main phase-separator chamber open in a direction counter to the direction of the gas flow being formed externally on the wave crest. A collector chamber formed in the rear of the main phase-separator chamber, and/or an outlet phase-separator chamber formed in the outlet section and open in a direction counter to the direction of the gas flow, may also be provided.

The terms "wave crest" and "wave trough", as applied to a separator plate of an apparatus of the type outlined, require an explanation. These terms are being used very broadly in connection with the present invention; they relate to both sinusoidal and trapezoidal as well as zigzag waves. Obviously a wave crest on one side of a separator plate is a wave trough on the other side of that separator plate, and vice versa. The main phase-separator chamber is then disposed externally, as it were, that is to say, at the top of the wave crest, the opposite being a main phase-collector chamber disposed internally, in other words, at the bottom of a wave trough. Moreover, while what follows applies primarily to an apparatus which comprises separator plates having just one wave crest each, it is not limited to such an apparatus but is applicable mutatis mutandis also to apparatuses comprising separator plates which have several wave crests each. Finally, it should be noted that the inlet section and/or the outlet section often coincide with a wave trough, particularly in the case of an apparatus comprising separator plates with but one wave crest each.

In the prior-art apparatus outlined at the outset and which is the point of departure for the invention (see published German patent application DAS No. 21 48 079, FIG. 4), the main phase-separator chambers of individual wave crests are formed by webs which extend over the length of the wave crests and comprise arcuate segments. In cross section, the continuous webs having arcuate segments form a T-type profile, as it were, and these separator plates therefore lend themselves particularly well to being molded from plastics by extrusion. Through the web and the arcuate segment, a collector chamber is formed downstream of the main phase-separator chamber, in the direction of the gas flow, in which very small liquid droplets in particular can be captured and separated through vortex formation.

The prior-art apparatus for the separation of liquid drops and particulate solids from a gas stream is suited for large and small liquid drops and for high and low free-stream velocities of the gas. It is particularly well suited for low free-stream velocities, where rather high separation efficiencies are achieved.

One problem with the prior-art apparatus discussed above is the pressure drop which occurs with a given predetermined separation efficiency, and which in the case of the desired separation efficiencies is relatively high. Moreover, the limiting drop size there falls short of being satisfactory.

Departing from the prior art outlined above, the invention has as its object to provide an apparatus which on the one hand offers a high separation efficiency for both low and high free-stream velocities and for both large and small liquid drops and in which on the other hand the pressure drop or energy loss of the flowing gas is minimal, and which can be manufactured economically.

The apparatus in accordance with the invention which accomplishes the stated object is characterized in that in the inlet section an inlet nozzle is formed which permits the gas stream to be directed onto the region on the inlet side of the opposite impingement-wall section. An inlet phase-separator chamber which is open in the direction of the gas flow is preferably formed internally in the inlet section as an inlet nozzle.

Providing an inlet nozzle in the inlet section of each separator plate of the apparatus of the invention has the effect that the gas stream is accelerated toward the region on the inlet side of the impingement-wall section opposite the inlet opening. Assurance is thus provided that the gas stream will interact with the impingement-wall section so that liquid drops will effectively be separated from the gas stream. A skillfully designed inlet nozzle will positively assure, moreover, that pronounced changes in direction are imposed on the gas stream in all zones under all circumstances.

The invention recognizes that especially the portion of the entering gas stream which flows along the inner edge of a separator plate is likely to traverse the flow passage practically without any change in direction. This is remedied by the use of an inlet phase-separator chamber constructed as an inlet nozzle since that region is then blocked, as it were. The inlet phase-separator chamber offers the further advantage that additional separation of liquid drops is induced there by vortex formation, particularly with high free-stream velocities and small liquid drops. The inlet phase-separator chamber, which acts as an inlet nozzle, can readily be produced by bending every separator plate into a U located on the side opposite the main phase-separator chamber to form the inlet phase-separator chamber in the inlet section.

If the inlet nozzle in the apparatus of the invention is not to be constructed as an inlet phase-separator chamber, then an especially advantageous design is characterized in that every separator plate is made particularly thick-walled in the inlet zone and/or is made hollow in the inlet zone for formation of an inlet nozzle.

To improve the separation efficiency further without increasing the drag, it is advisable to provide the inlet phase-separator chamber, the main phase-separator chamber, the collector chamber and/or the outlet phase-separator chamber, and especially the outlet phase-separator chamber, with a backflow barrier. The latter will prevent liquid drops which have flowed into the outlet phase-separator chamber from being again entrained. This teaching is important even quite independently of the previously described teaching of the present invention. In accordance with a preferred embodiment of this teaching, the apparatus of the invention is characterized in that a deflector flange which preferably projects into the outlet phase-separator chamber at an angle of about 45 degrees is provided as a backflow barrier. Depending on the direction of the gas stream, this means that the deflector flange is disposed at an angle of from 0 to 90 degrees to the direction of the gas flow. More particularly, an angle of about 80 degrees relative to the direction of the gas stream is here advisable.

In accordance with a further teaching of the invention which has very special and independent importance, an apparatus of the type under discussion is characterized in that the collector chamber of each separator plate opens inwardly approximately at right angles to the direction of the gas stream. In other words, at the bottom of a wave trough corresponding to a wave crest with an external main phase-separator chamber, a further phase-separator chamber in the form of a collector chamber is formed. This collector chamber is located directly downstream of the main phase-separator chamber, in the direction of the gas flow, and hence in the region of high gas-stream velocity, and more particularly in the constriction formed by the main phase-separator chamber of the adjacent separator plate. However, the location of the collector chamber, selected in accordance with the invention, does not further reduce the cross-sectional area for the gas stream at that point; for while this collector chamber acts inwardly, it is physically external to and in the lee, as it were, of the associated main phase-separator chamber. In conjunction with the opening of this collector chamber at right angles to the direction of the gas flow, a vortex is here formed in the gas stream, and this represents an optimum compromise in the sense discussed earlier. Excellent separation efficiency is thus secured, particularly with high free-stream velocities and small liquid drops. For reasons of fluid mechanics, it is advisable to provide a leading edge between the collector chamber and the impingement-wall section located ahead of the collector chamber. From a production and fluid-mechanics point of view, it is desirable that the rear wall of the collector chamber, in the direction of the gas flow, be formed by the adjacent impingement-wall section.

With a view to securing a uniform high separation efficiency under all possible operating conditions, it has, on the whole, proved particularly desirable to design the apparatus of the invention in such a way that each separator plate is provided in a row with an inlet phase-separator chamber and a collector chamber, open in the direction of the gas flow or at right angles thereto, respectively, alternating with a main phase-separator chamber and an outlet phase-separator chamber, open in a direction counter to the direction of the gas flow.

Moreover, it is occasionally advisable to construct the apparatus of the invention in such a way that the impingement-wall sections of each separator plate are provided with additional, preferably recessed collector channels and/or that the transition between the impingement-wall sections and the inlet section is at an obtuse angle. The collector channels reduce the likelihood that drops or secondary drops will rebound from the critical regions of the impingement-wall sections. The nonconstant changes in the direction of flow of the gas stream in the transitional regions between impingement-wall sections and inlet section or outlet section, respectively, bring about a further increase in separation efficiency which has practically no adverse effect on the drag, and hence on the pressure drop.

On the whole, the apparatus in accordance with the invention is distinguished by an extremely high separation efficiency with low drag, that is to say, low pressure drop or energy loss of the flowing gas. For example, the separation efficiency of the apparatus of the invention is approximately equal to that of a prior-art "three-stage" apparatus whereas the pressure drop is substantially lower than in that apparatus, the explanation being that the apparatus of the invention is a "single-stage" apparatus.

Of course, it is possible to construct the apparatus of the invention as a "multistage" apparatus, which will make possible a further improvement in separation efficiency and a further reduction in limiting drop size, though at the expense of an increase in pressure drop. A corresponding embodiment of the apparatus in accordance with the invention is characterized in that a plurality of separator plates is arranged in a row in the direction of the gas flow and, optionally, in that the successive separator plates are offset relative to one another at right angles to the direction of the gas flow.

The apparatus of the invention can be improved in one other respect by providing an agglomerator ahead of the separator plates, in the direction of the gas flow. Such an agglomerator will gather the smaller and smallest liquid drops into larger drops, which can then be separated. The use of an agglomerator thus results in a further reduction in limiting drop size and in increased separation efficiency. It has been found that when prior-art agglomerators are used with an apparatus constructed in accordance with the invention, a better-than-proportionate improvement in separation efficiency is obtained. A prior-art agglomerator used in conjunction with a prior-art "three-stage" apparatus will result in an improvement in separation which is only about half that achieved when such an agglomerator is used with the apparatus of the invention. This may be due to the fact that the agglomerator itself causes some pressure drop in the gas stream, and that the lower pressure drop in the apparatus of the invention therefore is an important factor.

In accordance with a further teaching of the invention which is of special importance quite independently of the features described earlier, the apparatus of the invention is characterized in that a second outlet phase-separator chamber is provided in the outlet section, and that the first and second outlet phase-separator chambers open onto opposite sides of the separator plate in question. A particularly practical design is characterized in that the second outlet phase-separator chamber is disposed downstream of the first outlet phase-separator chamber, in the direction of the gas flow, and is preferably provided with a deflector flange extending into its interior as a backflow barrier.

As pointed out earlier, the measures in accordance with the invention make it possible to obtain a high separation efficiency with low pressure drop or low energy loss even with high free-stream velocities. The separation efficiency can be further improved, especially with high free-stream velocities of about 10 to 12 meters/second, by providing, in accordance with a further teaching of the invention that has inventive significance even independently of all measures described earlier, an auxiliary phase-separator chamber externally on the chamber wall bounding the main phase-separator chamber. The auxiliary phase-separator chamber then is preferably disposed at the end of the chamber wall remote from the opening of the main phase-separator chamber and is open in a direction counter to the direction of the gas flow.

The invention will now be described in greater detail with reference to a drawing which merely illustrates a preferred embodiment and wherein.

Figure 3:
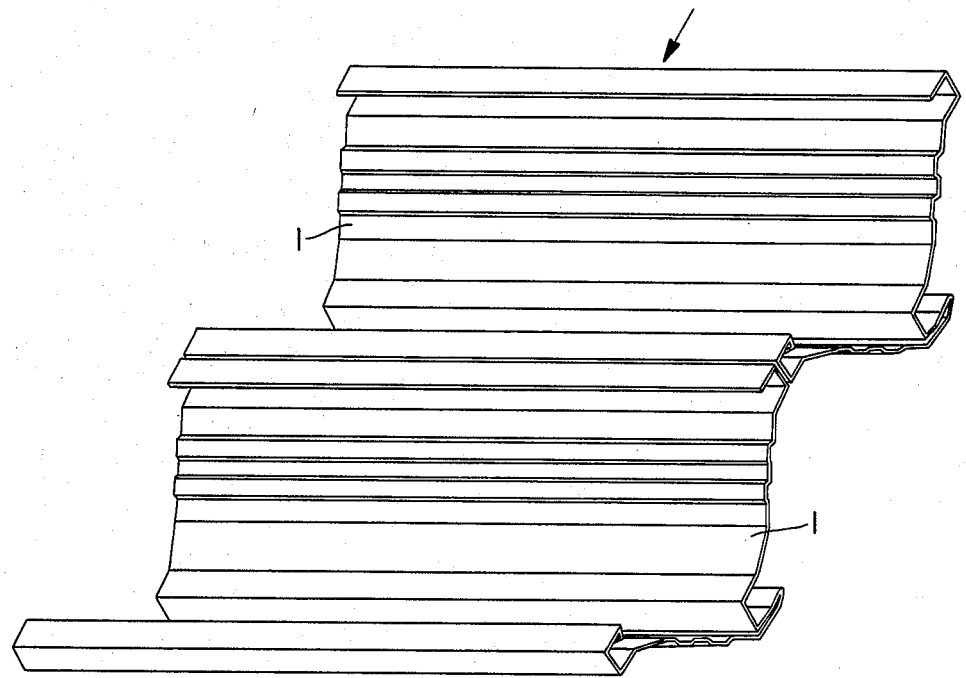
FIG. 3 shows two separator plates arranged in a row for an apparatus in accordance with the invention.
Figure 4:
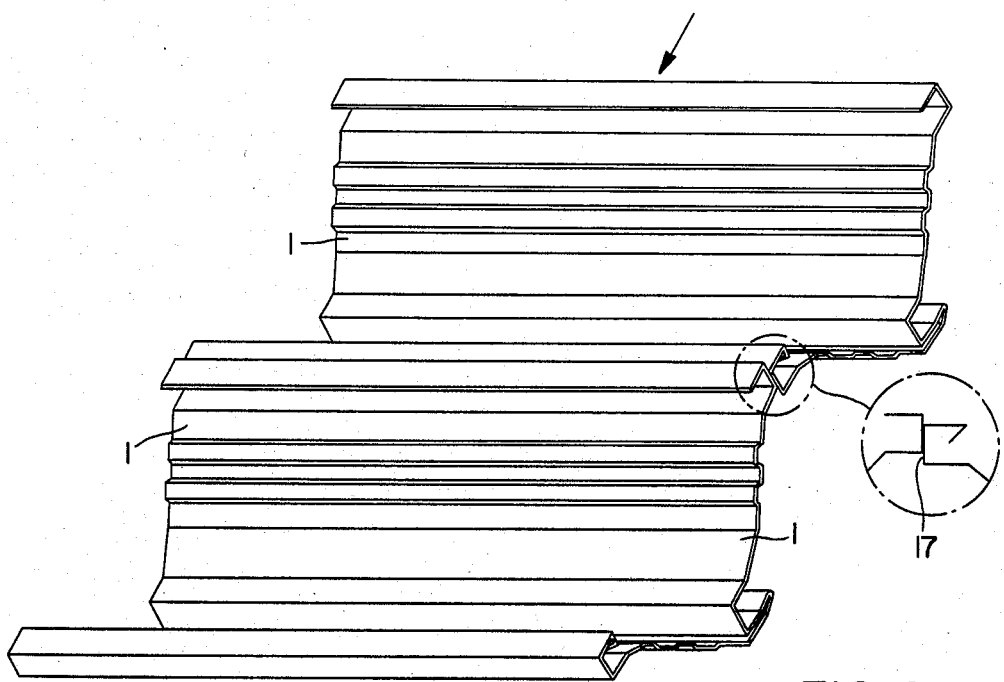
Figure 5:
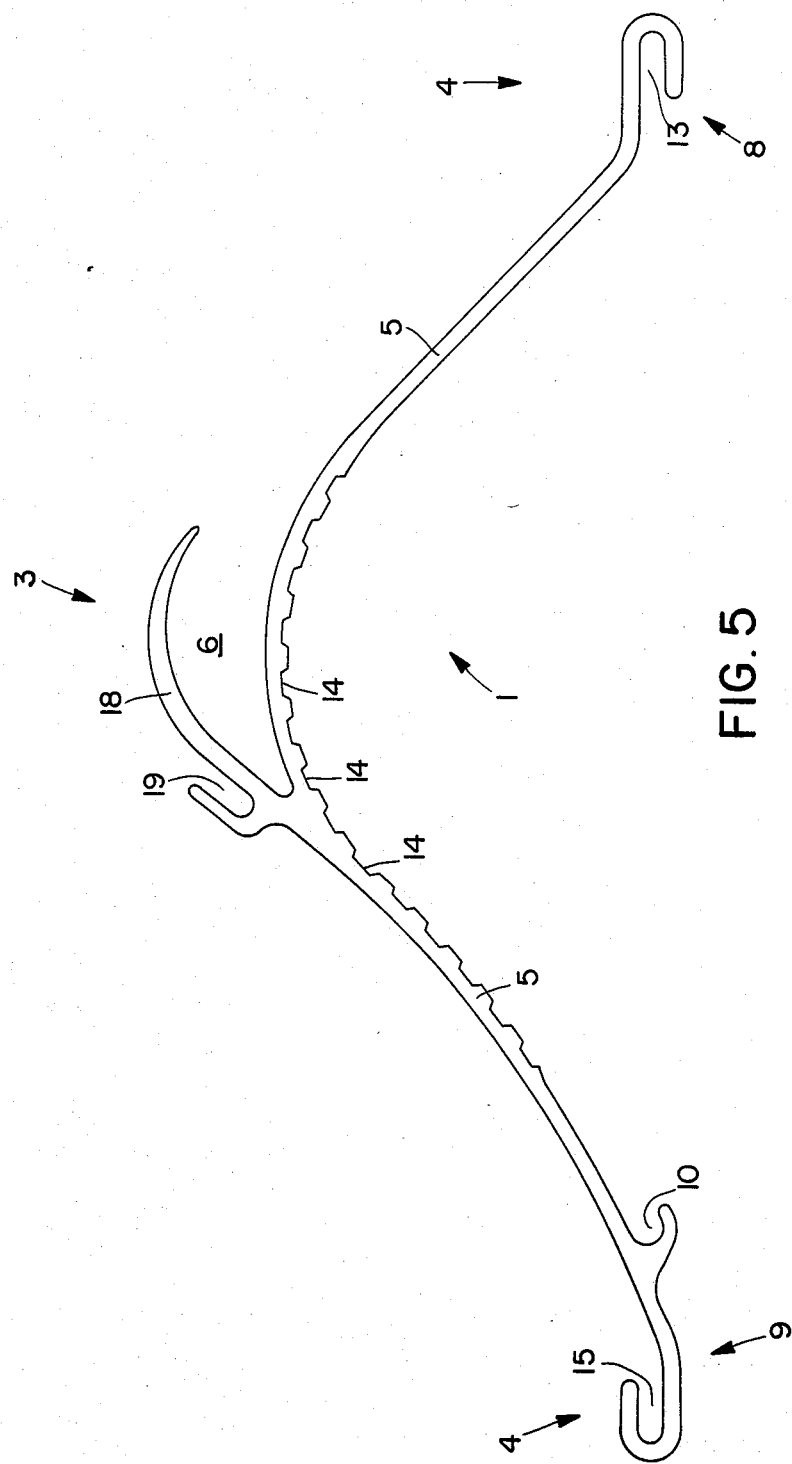

FIG. 4, like FIG. 3, shows two separator plates arranged in a row for an apparatus in accordance with the invention, the separator plates being offset relative to one another at right angles to the direction of the gas flow; and FIG. 5 shows another embodiment of a separator plate for an apparatus in accordance with the invention.

Figure 1:
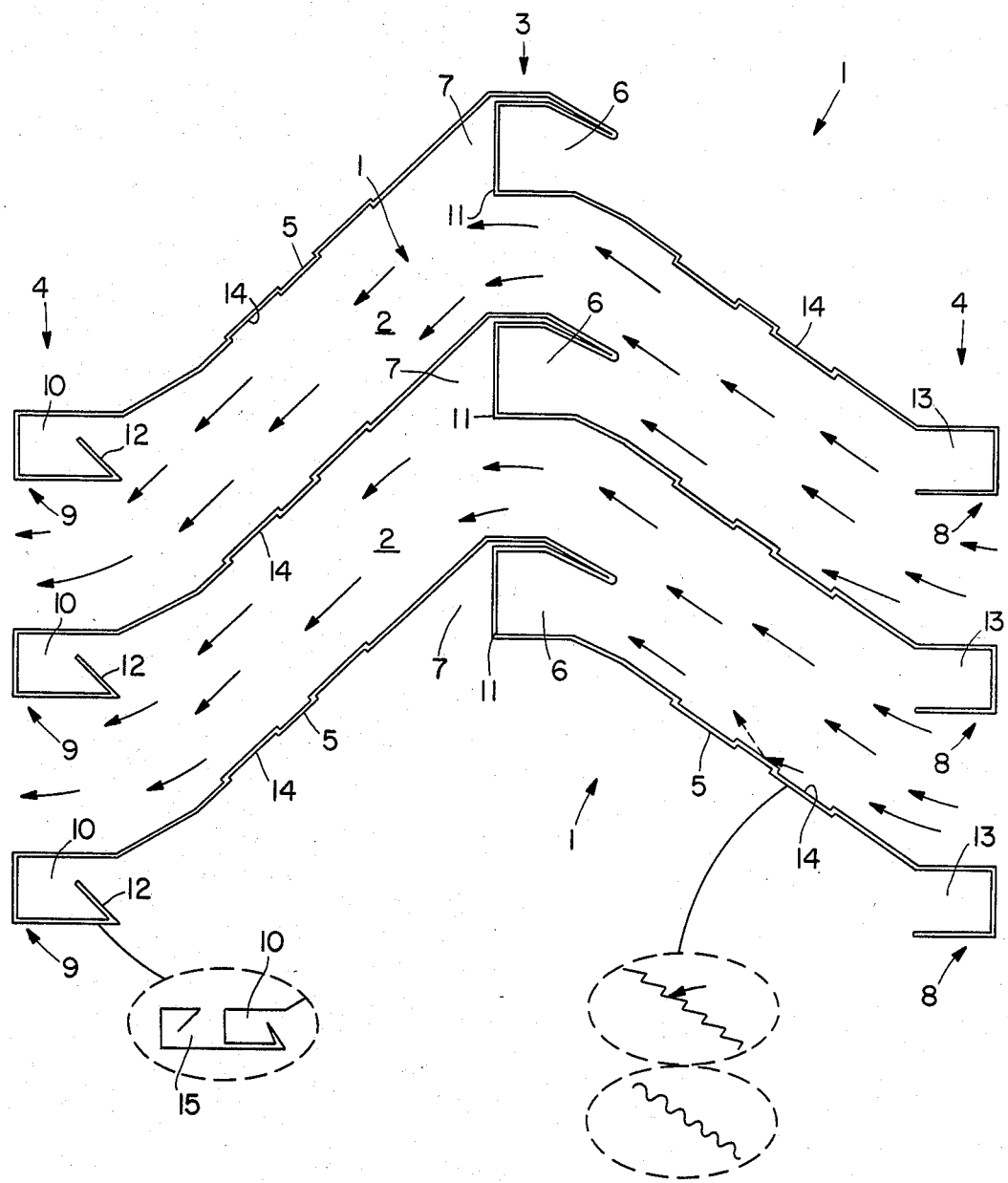
FIG. 1 is a cross-sectional view of an apparatus in accordance with the invention comprising three spaced separator plates.

Shown in FIG. 1 is a plurality, and more particularly a total of three, separator plates 1 which have a wave-like cross section and are spaced from one another. As a result, flow passages 2 for a gas stream are formed between the separator plates 1. The direction of the gas flow is indicated by arrows.

It is readily apparent that in the embodiment shown every separator plate 1 comprises a wave crest 3 and two wave troughs 4, an impingement-wall section 5 being formed between the wave crest 3 and each wave trough 4. In proximity to the wave crest 3, a main phase-separator chamber 6 open in a direction counter to the direction of the gas flow is formed externally, that is to say, at the top of the wave crest 3. Disposed in the rear of the main phase-separator chamber 6, in the direction of the gas flow, is a collector chamber 7. This collector chamber 7 will be described in detail further on.

Each separator plate 1 comprises an inlet section 8 and an outlet section 9, an outlet phase-separator chamber 10 being formed in the outlet section 9. The outlet phase-separator chamber 10 is open in a direction counter to the direction of the gas flow.

It is apparent from FIG. 1 that the collector chamber 7 opens inwardly approximately at right angles to the direction of the gas flow, that a leading edge 11 is provided between the collector chamber 7 and the impingement-wall section 5 upstream of the collector chamber 7; and that the rear wall of the collector chamber 7, in the direction of the gas flow, is formed by the adjacent impingement-wall section 5.

The outlet phase-separator chamber 10 is provided with a backflow barrier in the form of a deflector flange 12 which projects at an angle of about 45 degrees into the outlet phase-separator chamber 10 and is disposed at an angle of about 80 degrees to the direction of the gas flow in this region.

In each of the separator plates 1 shown in FIG. 1, an inlet nozzle is formed in the inlet section 8 in the form of an inlet phase-separator chamber 13 disposed internally in the inlet section 8. As a result, the gas stream here is accelerated and directed onto the opposite impingement-wall section 14 and also urged inwardly at the edge so that even the marginal portion of the gas stream is subjected to pronounced changes in the direction of flow. The inlet phase-separator chamber 13 is open in the direction of the gas flow and thus approximately U-shaped. In the separator plates 1 shown, there are thus provided overall, in a row, an inlet phase-separator chamber 13 and a collector chamber 7, open in the direction of the gas flow or at right angles thereto, respectively, alternating with a main phase-separator chamber 6 and an outlet phase-separator chamber 10, open in a direction counter to the direction of the gas flow.

FIG. 1 further shows that the impingement-wall sections 5 are additionally provided with recessed collector channels 14. In detail views, FIG. 1 also shows two further designs for the additional collector channels 14 which have proved advantageous particularly in that they reduce the likelihood that drops or secondary drops will rebound in this zone.

As is also apparent from FIG. 1, the transition from the impingement-wall sections 5 to the inlet section 8 and the outlet section 9, respectively, is at an obtuse angle.

In FIG. 1 there is further indicated an occasionally preferable embodiment of an apparatus in accordance with the invention in which an additional outlet phase-separator chamber 15 is provided downstream of the outlet phase-separator chamber 10, in the direction of the gas flow. It is apparent that the second outlet phase-separator chamber 15 opens outwardly, that is to say, onto a side opposite to that of the first phase-separator chamber 10 of a given separator plate 1. Large drops which may possibly flow out of the main phase-separator chamber 6 and flow along the separator plate 1 may be captured in the second outlet phase-separator chamber 15.

Figure 2:
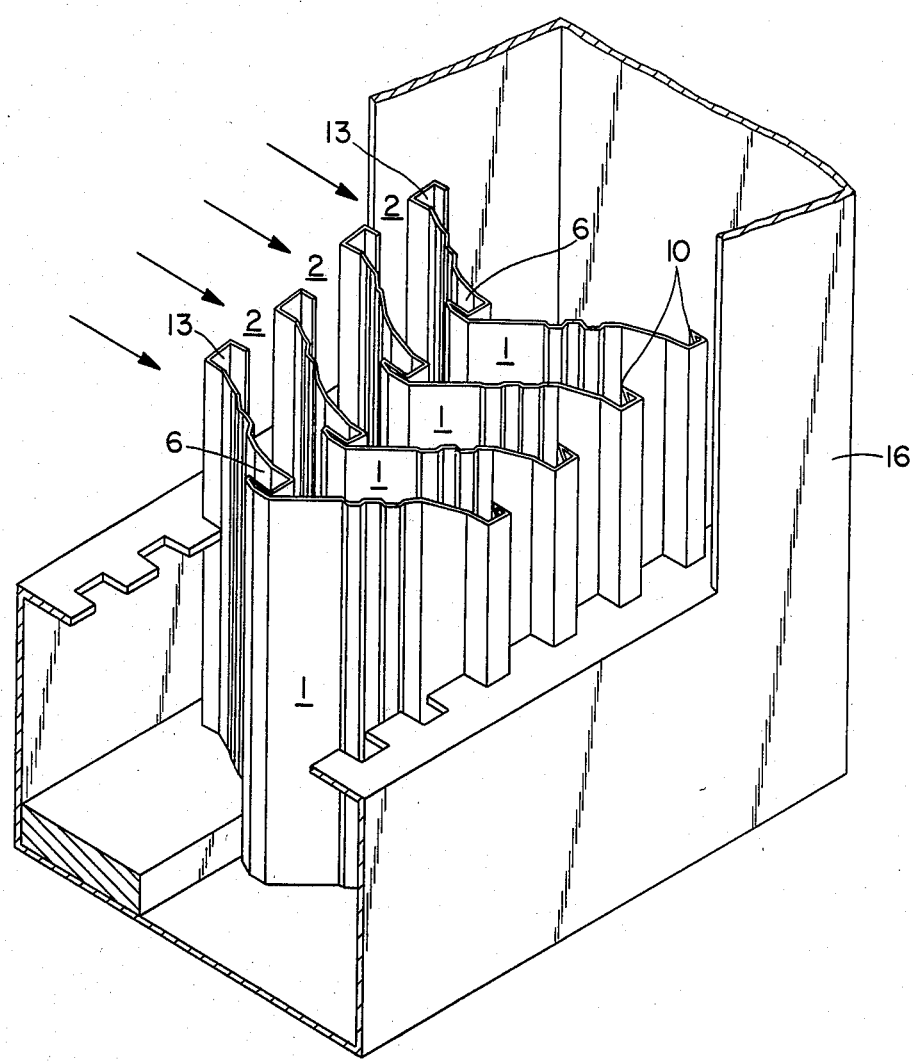
FIG. 2 is a cutaway and partly cross-sectional perspective view of an apparatus according to FIG. 1.

FIG. 2 is a perspective view of the apparatus described in detail in connection with FIG. 1. From the latter it is apparent that the gas stream enters the apparatus horizontally. The separator plates are vertically set into a casing 16 of the type known from the prior art. FIG. 2 makes it particularly clear how in the apparatus of the invention extensive deflection of the entire gas stream is assured even with a low "amplitude" of wave crest 3 and wave troughs 4 of the separator plates 1.

FIGS. 3 and 4 show how separator plates 1 can be assembled in a row to form a "multistage" apparatus. Shown in FIG. 4 is a special design, the separator plates 1 arranged in a row being offset (at 17) relative to each other at right angles to the direction of the gas flow, indicated by an arrow.

FIG. 5 shows an embodiment of a separator plate 1 for an apparatus in accordance with the invention which is characterized in that an auxiliary phase-separator chamber 19 is provided externally on the chamber wall 18 which bounds the main phase-separator chamber 6. In the embodiment shown, the auxiliary phase-separator chamber 19 is disposed at the end of the chamber wall 18 remote from the opening of the main phase-separator chamber 6 and opens in a direction counter to the direction of the gas flow.

We claim:

1. An apparatus for the separation of liquid drops or particulate solids from a gas stream comprising a plurality of parallel separator plates, a flow passage being formed between every two separator plates, each separator plate having at least one wave crest disposed approximately in its center and two wave troughs disposed at its edge on the inlet side and the outlet side, respectively, and forming an inlet section and an outlet section, respectively, as well as impingement-wall sections formed between the wave crest and the wave troughs, a main phase-separator chamber open in a direction counter to the direction of the gas flow being formed on the upper surface of the wave crest, and a collector chamber located at the wave crest immediately adjacent to the main phase-separator chamber, said collector chamber extending to the external side of the separator plate but opening on the bottom surface of the separator plate approximately at a right angle to the direction of the gas flow.

2. An apparatus according to claim 1, characterized in that there is internally formed in the outlet section an outlet-phase separator chamber open in a direction counter to the direction of the gas flow.

3. An apparatus according to claim 1, characterized in that an inlet nozzle is formed in the inlet section, the gas stream by means of said inlet nozzle being directable onto the region on the inlet side of the opposite impingement-wall section.

4. An apparatus according to claim 3, characterized in that each separator plate is made hollow in the inlet zone to form the inlet nozzle.

5. An apparatus according to claim 3, characterized in that there is internally formed in the inlet section as an inlet nozzle an inlet phase-separator chamber which is open in the direction of the gas flow.

6. An apparatus according to claim 5, characterized in that each separator plate is bent into a U located on the side opposite the main phase-separator chamber to form the inlet phase-separator chamber in the inlet section.

7. An apparatus according to claim 3, characterized in that each separator plate is made particularly thick-walled in the inlet zone to form the inlet nozzle.

8. An apparatus according to claim 1, characterized in that the outlet phase-separator chamber is provided with a backflow barrier.

9. An apparatus according to claim 1, characterized in that the backflow barrier is formed by a deflector flange which projects, preferably at an angle of about 45 degrees, into the outlet phase-separator chamber.

10. An apparatus according to claim 7, characterized in that the deflector flange is disposed at an angle of from 0 to 90 degrees, and preferably of 80 degrees, to the direction of the gas flow.

11. An apparatus according to claim 1, characterized in that a leading edge is provided between the collector chamber and the impingement-wall section located upstream of the collector chamber.

12. An apparatus according to claim 1, characterized in that the rear wall of the collector chamber, in the direction of the gas flow, is formed by the adjacent impingement-wall section.

13. An apparatus according to claim 1, characterized in that there are disposed in a row an inlet phase-separator chamber and a collector chamber, alternating with a main phase-separator chamber and an outlet phase-separator chamber, open in a direction counter to the direction of the gas flow.

14. An apparatus according to claim 1, characterized in that the impingement-wall sections are provided with additional and preferably recessed collector channels.

15. An apparatus according to claim 1, characterized in that the transition between the impingement-wall sections and the inlet section and the outlet section, respectively, is at an obtuse angle.

16. An apparatus according to claim 1, characterized in that a plurality of separator plates is arranged in a row in the direction of the gas flow.

17. An apparatus according to claim 16, characterized in that the separator plates arranged in a row are offset relative to one another in the direction of the gas flow.

18. An apparatus according to claim 1, characterized in that an agglomerator precedes the separator plates in the direction of the gas flow.

19. An apparatus according to claim 2, characterized in that a second outlet phase-separator chamber is disposed in the outlet section, and that the first outlet phase-separator chamber and the second outlet phase-separator chamber open onto opposite sides of a given separator plate.

20. An apparatus according to claim 19, characterized in that the second outlet phase-separator chamber is disposed downstream of the first outlet phase-separator chamber, in the direction of the gas flow, and is preferably provided with a deflector flange extending into its interior as a backflow barrier.

21. An apparatus for the separation of liquid drops or particulate solids from a gas stream comprising a plurality of parallel separator plates, a flow passage being formed between every two separator plates, each separator plate having at least one wave crest disposed approximately in its center and two wave troughs disposed at its edge on the inlet side and the outlet side, respectively, and forming an inlet section and an outlet section, respectively, as well as impingement-wall sections formed between the wave crest and the wave troughs, a main phase-separator chamber having a chamber wall and being open in a direction counter to the direction of the gas flow being formed externally on the wave crest, and an auxiliary phase-separator chamber disposed externally on the chamber wall bounding the main phase-separator chamber.

22. An apparatus according to claim 21, characterized in that the auxiliary phase-separator chamber is disposed at the end of the chamber wall remote from the opening of the main phase-separator chamber.

23. An apparatus according to claim 21, characterized in that the auxiliary phase-separator chamber opens in a direction counter to the direction of the gas flow.

* * * * *